United States Patent [19]

Hinckley

[11] Patent Number: 4,898,446

[45] Date of Patent: Feb. 6, 1990

[54] OPTICAL FIBER CONNECTOR

[75] Inventor: Roger L. Hinckley, Hackettstown, N.J.

[73] Assignee: American Telephone and Telegraph Company, AT&T Bell Laboratories, Murray Hill, N.J.

[21] Appl. No.: 263,744

[22] Filed: Oct. 28, 1988

[51] Int. Cl.$^4$ ................................................ G02B 6/38
[52] U.S. Cl. .............................. 350/96.20; 350/96.21
[58] Field of Search ............... 350/96.20, 96.21, 96.22, 350/96.23

[56] References Cited

U.S. PATENT DOCUMENTS

| | | | |
|---|---|---|---|
| 3,803,409 | 4/1974 | Prochazka | 350/96.21 |
| 4,178,068 | 12/1979 | Hoover | 350/96.21 |
| 4,225,214 | 9/1980 | Hodge et al. | 350/96.21 |
| 4,240,695 | 12/1980 | Evans | 350/96.21 |
| 4,268,115 | 5/1981 | Slemon et al. | 350/96.20 X |
| 4,327,964 | 5/1982 | Haesly et al. | 350/96.20 |
| 4,330,172 | 5/1982 | Monaghan et al. | 350/96.21 |
| 4,427,879 | 1/1984 | Becher et al. | 350/96.20 |
| 4,611,887 | 9/1986 | Glover et al. | 350/96.21 |
| 4,705,352 | 11/1987 | Margolin et al. | 350/96.21 |
| 4,738,508 | 4/1988 | Palmquist | 350/96.21 |
| 4,747,658 | 5/1988 | Borsuk et al. | 350/96.20 |
| 4,822,131 | 4/1989 | Anderton | 350/96.21 |
| 4,834,494 | 5/1989 | DeMeritt et al. | 350/96.21 |
| 4,836,637 | 6/1989 | Poorman et al. | 350/96.21 |

FOREIGN PATENT DOCUMENTS

| | | | |
|---|---|---|---|
| 0177937 | 4/1986 | European Pat. Off. | 350/96.20 X |
| 2086602 | 5/1982 | United Kingdom | 350/96.21 |

Primary Examiner—William L. Sikes
Assistant Examiner—Brian M. Healy
Attorney, Agent, or Firm—Lester H. Birnbaum

[57] ABSTRACT

Disclosed is an optical fiber connector useful for high density arrays. A locking collar is mounted near the rearward portion of a fiber ferrule. The collar includes tabs which engage holes in the connector sleeve when the ferrule is inserted therein. The fiber can be inserted and removed by a tool which depresses the tabs. Space is conserved since the locking mechanism is located entirely within the sleeve.

9 Claims, 3 Drawing Sheets

OPTICAL FIBER CONNECTOR

BACKGROUND OF THE INVENTION

This invention relates to optical fiber connectors.

Optical connectors are necessary throughout lightwave systems wherever it is desired to optically couple two or more fibers together. Typical connectors employ a glass ferrule in which the fibers are situated. The ferrules are inserted within opposite ends of a sleeve so that the ferrules, and therefore the fibers, are aligned. In one form of connector, the ferrule is locked into the sleeve by means of rotating the ferrule until a tab on the sleeve is engaged by a collar mounted around the ferrule (See, for example, U.S. Pat. No. 4,738,508 issued to Palmquist). Other types of connectors employ a latching mechanism to lock the ferrule into the sleeve (See, e.g., U.S. Pat. No. 4,240,695 issued to Evans; U.S. Pat. No. 4,327,964 issued to Haesly; and U.S. Pat. No. 4,611,887 issued to Glover). Latching mechanisms have also been proposed for male-female optical connector configurations (See, e.g., U.S. Pat. No. 4,225,214 issued to Hodge et al).

While adequate for most applications, most presently-available connectors cannot be easily adapted for use where a high density of fiber arrays is required. For example, in providing lightwave communications to each home, the fibers must be housed in underground closures where space is severely limited. This may require, for example, an array of 864 fibers in a panel measuring 38 cm high, 46 cm wide and 25 cm deep, which translates into a center-to-center spacing for the fibers of just 1.02 cm. In such dense arrays, it is difficult, if not impossible, for a technician to remove a fiber connector which requires either rotation or latch tripping by insertion of a hand around the connector in the space between adjacent connectors.

In order to deal with this problem, it has been proposed to provide a connector with a rotating mechanism which engages tabs on the connector sleeve so that the fiber can be inserted and removed by a longitudinal force exerted on the fiber (See U.S. patent application of C. W. Scott, Jr. filed on an even date herewith).

It is, therefore, an object of the invention to provide an alternative design of optical fiber connectors which can be used conveniently in dense fiber arrays.

SUMMARY OF THE INVENTION

This and other objects are achieved in accordance with the invention which is an optical fiber connector comprising a ferrule adapted for insertion of at least one optical fiber therein. The ferrule has a forward end and a rearward end. A sleeve is adapted to receive the ferrule therein at one end so that the forward end of the ferrule is aligned with another ferrule inserted in the opposite end of the sleeve. The surface of the sleeve includes at least one hole at each end. The connector further includes a collar mounted near the rearward end of the ferrule and including at least one locking tab adapted to engage said hole in the sleeve so that the ferrule is secured within the sleeve.

BRIEF DESCRIPTION OF THE DRAWING

These and other features of the invention are delineated in detail in the following description. In the drawing.

It will be appreciated that, for purposes of illustration, these figures are not necessarily drawn to scale.

DETAILED DESCRIPTION

Figure 1:
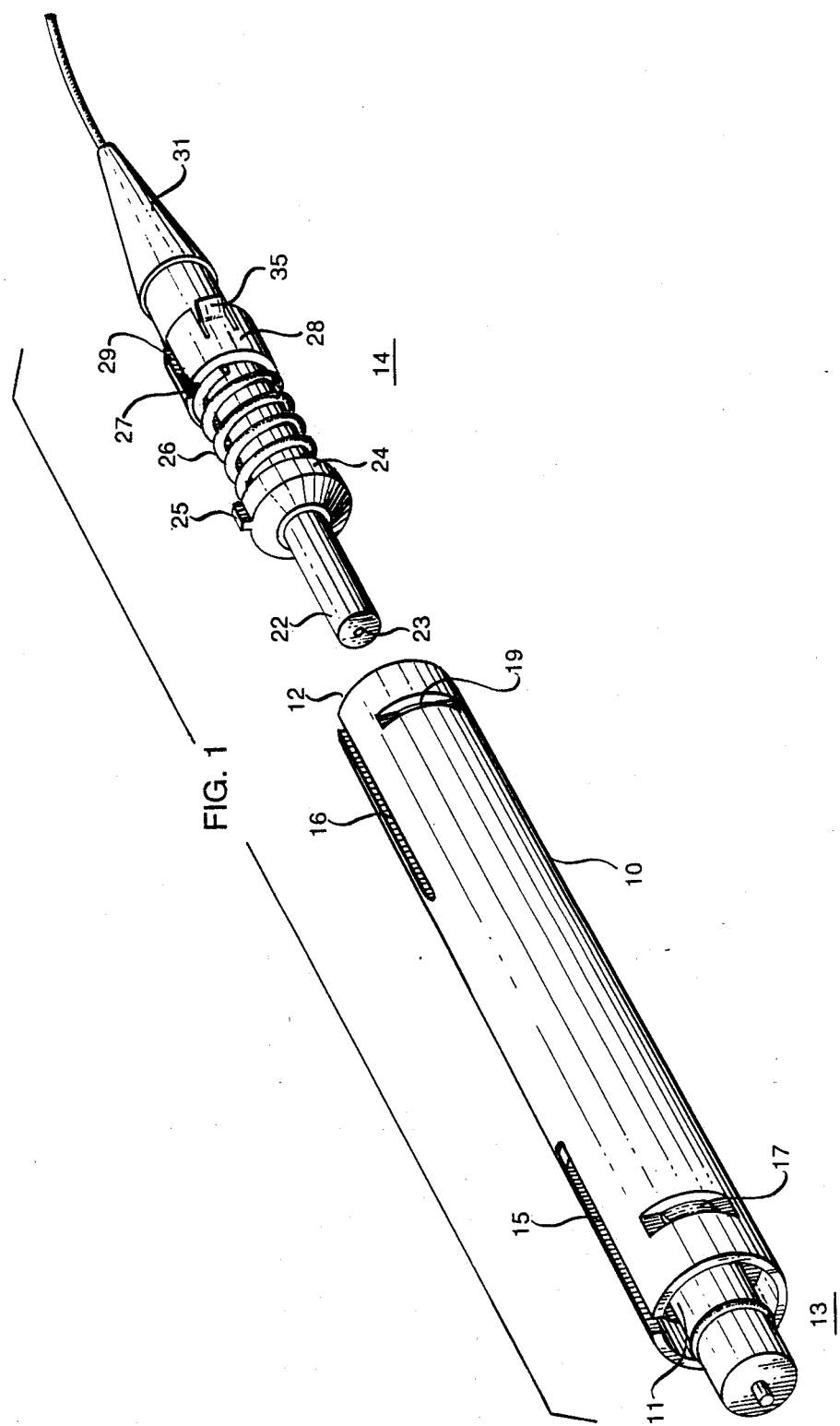
FIG. 1 is a perspective view of a connector in accordance with an embodiment of the invention.
Figure 2:
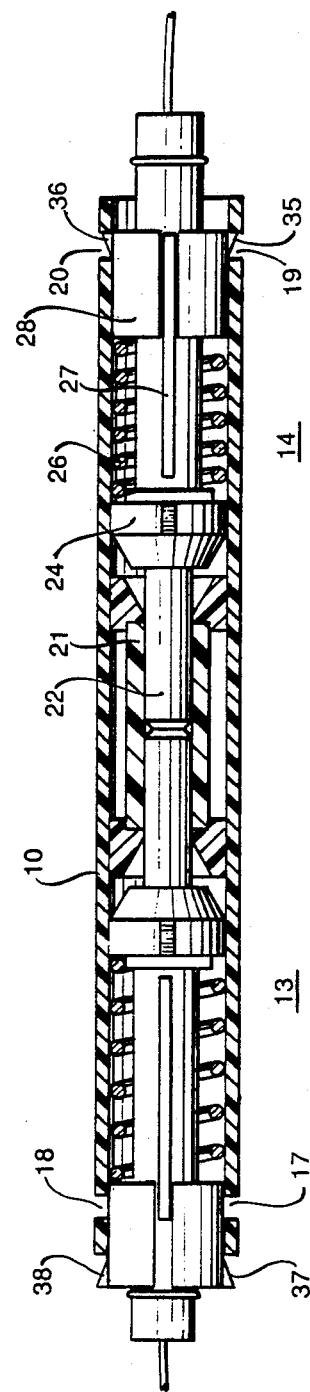
FIG. 2 is a cross-sectional view of the connector in accordance with the same embodiment.
Figure 3:
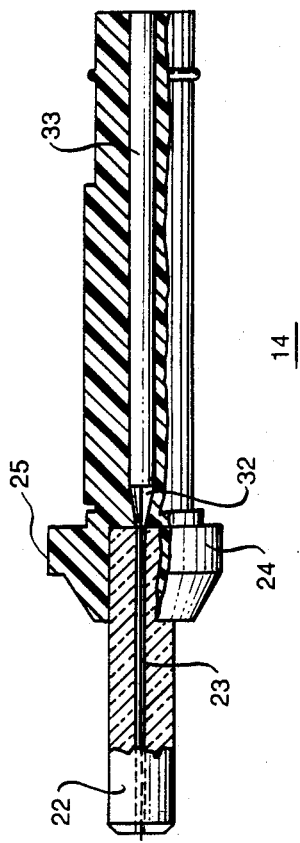
FIG. 3 is a partly cutaway view of a portion of the connector of FIGS. 1 and 2.

The basic components of the connector in accordance with one embodiment are illustrated in the perspective view of FIG. 1, the cross-sectional view of FIG. 2, which is rotated approximately 90 degrees with respect to the view of FIG. 1 for illustrative purposes, and the partly cutaway view of FIG. 3. The sleeve 10 is cylindrical with open ends 11 and 12 for receiving fiber "plugs" 13 and 14 therein. The sleeve is typically mounted within a panel (not shown) along with other connections so that the ends 11 and 12 protrude from opposite surfaces of the panel. Each end of the sleeve includes an alignment groove 15 and 16 and a pair of opposed locking holes (17, 18 and 19, 20 respectively). The sleeve also includes an insert, 21 of FIG. 2, at the center for receiving and aligning the forward ends of each plug. It should be appreciated that, although sleeve is shown with the slots 15 and 16 on top, the sleeve would typically be mounted in the panel with the slots downward to facilitate cleaning and draining of the connectors.

Each plug, 13 and 14, is essentially identical, and so attention will be directed only to plug 14 for purposes of description. The forward portion of the plug includes a ferrule 22, typically made of glass, which has a bare optical fiber, 23 of FIG. 3, inserted therein. The ferrule is mounted within a barrel member 24 which is essentially cylindrical but includes a larger outer diameter section at the forward portion and a smaller diameter section at the rearward portion. The larger diameter section houses the ferrule and also includes an alignment tab 25 adapted for insertion in the slit 16 at the end of the sleeve. The inner portion of the smaller diameter section includes a tapered cavity, 32, which houses the fiber and its protective jacket, 33 (See FIG. 3). The barrel is typically made of polycarbonate. Mounted over the outer surface of the smaller diameter section is a spring element, 26.

An essentially cylindrical locking collar, 28, is mounted over the rearward portion of the smaller diameter section of the barrel with the spring situated between it and the larger diameter section of the barrel. A slit 29 in the collar engages a strip 27 formed on the outer surface of the smaller diameter section of the barrel so that the collar is aligned with the tab 25. The collar, which is typically made of a reinforced flexible polycarbonate material, includes a pair of opposing tabs 35, 36 on its rearward surface portion.

The jacketed fiber extends out of the rearward portion of the barrel as shown. A strain relief member 31 can be provided at this portion by slipping the relief member over the rearward portion of the barrel behind the collar.

FIG. 2 illustrates in a cross-sectional view the insertion of both plugs 13 and 14 in the sleeve 10. In the case of plug 14, for example, tab 25 is inserted in slot 16

(FIG. 1) so that the ferrule 22 is introduced into member 21. This aligns the fiber (23 of FIG. 3) in plug 14 with the fiber of plug 13. The pressure on the collar, 28, causes spring 26 to contract. Pressure is applied to collar 28 until the two tabs, 35 and 36, engage the holes 19 and 20 in the sleeve. At this point, the plug is locked into the sleeve. To remove the plug, the tabs 35 and 36 are depressed so they no longer make contact with the walls of the holes 19 and 20. The spring 26 will then force the plug out sufficiently so that the tabs clear the area of the holes and the plug can then be completely removed. For purposes of illustration, plug 13 is shown in the unlocked position.

It will be noted that since the locking tabs 35 and 36 are entirely within the outer diameter of the sleeve 10, this type of latching mechanism requires no additional space and, therefore, the connector can be used in spaces where the fibers are closely spaced.

Figure 4:
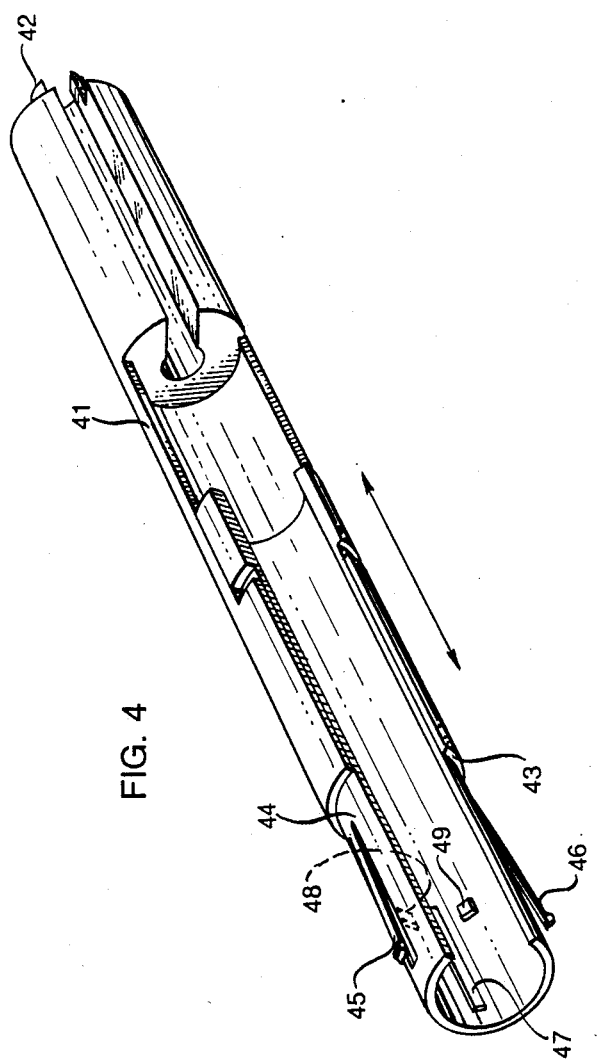
FIG. 4 is a perspective view, illustrating a tool for insertion and removal of optical fibers for use with the connector of FIGS. 1, 2 and 3.

A simple tool, such as is illustrated in FIG. 4, can be utilized for insertion and removal of the plugs to eliminate the need for grasping the connector in the area of the sleeve. The tool includes a handle 41 with one end, 42, adapted for insertion of the plug and the opposite end, 43, adapted for removal of the plug. The handle is essentially a hollow cylinder with longitudinal slits of different sizes on both ends. The insertion portion, 42, is also a hollow cylinder with a slit but with a smaller outer diameter than the handle. The smaller outer diameter essentially matches the outer diameter of the collar 28. The inner diameter of insertion portion 42 is sufficient so that the tool can be inserted over the rearward section of the barrel 24 and over the strain relief member 31. The insertion portion, therefore, provides a force to the collar until the tabs of the collar engage the holes 19 and 20 of the sleeve.

The opposite portion, 43, of the handle is adapted for removal of the plug. A slidably mounted element, 44, is inserted into this end of the handle. The sliding member includes a slit for insertion over the barrel and fiber, and the inner diameter of the sliding member is sufficient to fit over the sleeve 10. The sliding member includes on its outer surface a pair of opposing hammers, 45 and 46, which protrude beyond the outer diameter of the sliding member. Included in the inner surface of the sliding member is a guide member 47 and a pair of stops, 48 and 49. The guide member 47 aligns with the slit 16 in the sleeve and the stops make contact with the sleeve 10 when this end of the tool is inserted over the sleeve 10. Once the stops make contact, the hammers are positioned over the holes 19 and 20 of the sleeves. Further longitudinal pressure on the handle causes the member 44 to slide with respect to handle 41. When the edge of the handle reaches the ends of the hammers, the hammers will be depressed into the holes 19 and 20 in the sleeve to make contact with and release the tabs 35 and 36 of the locking collar. Pulling on the tool causes the sliding member to slide in the opposite direction to disengage the hammers from the holes. The tool and the plug can then be removed.

Of course, other types of tools may be designed for the purpose of insertion and removal of the connector according to the invention.

Various modifications of the invention will become apparent to those skilled in the art. For example, the locking holes can be round, rather than rectangular as shown, with the locking tabs having rounded rear edges. In addition, although the invention is shown for connecting two fibers together, it is also applicable to connecting a fiber to a light emitting device or photodetector where such a device is situated at one end of the sleeve. All such variations which basically rely on the teaching through which the invention has advanced the art are properly considered within the scope of the invention.

I claim:

1. An optical fiber connector comprising:
   a barrel member having a forward section and rearward section;
   a ferrule adapted for insertion of at least one optical fiber therein, said ferrule being mounted in the forward section of the barrel member;
   a sleeve adapted to receive said ferrule therein at one end, the surface of said sleeve including at least one hole at said one end; and
   a collar mounted over the rearward section of the barrel and including at least one locking tab adapted to engage said hole in the sleeve so that said ferrule is secured within the sleeve.

2. The device according to claim 1 wherein the sleeve includes a pair of holes on opposite portions of the surface of said receptacle, and the collar includes a pair of tabs adapted to engage the holes.

3. The device according to claim 1 wherein the barrel member is essentially cylindrical and the forward section includes a portion of relatively larger outer diameter and the rearward section include a portion of relatively smaller outer diameter.

4. The device according to claim 3 further comprising a spring between the larger diameter portion and the collar.

5. The device according to claim 3 wherein a portion of the smaller diameter section includes an alignment strip, and the collar is essentially cylindrical with a slit adapted to engage the alignment strip.

6. The device according to claim 3 wherein the sleeve includes a slit at said one end, and the larger diameter section of the barrel includes an alignment tab which is adapted for insertion in said slit.

7. The device according to claim 2 wherein the tabs extend within the outer surface of the sleeve when engaged in said holes.

8. The device according to claim 1 wherein the sleeve includes an end opposite to said one end for receiving another ferrule therein which is aligned with said ferrule.

9. The device according to claim 6 further comprising means for aligning said collar with said alignment tab.

* * * * *